United States Patent [19]

Neubauer

[11] 3,980,050

[45] Sept. 14, 1976

[54] POULTRY LITTER AND PREPARATION THEREOF

[75] Inventor: Howard A. Neubauer, Childersburg, Ala.

[73] Assignee: Kimberly-Clark Corporation, Neenah, Wis.

[22] Filed: Dec. 9, 1974

[21] Appl. No.: 530,707

[52] U.S. Cl. .................................................. 119/1
[51] Int. Cl.² .......................................... A01K 1/01
[58] Field of Search ..................... 119/1, 18, 21, 25

[56] References Cited
UNITED STATES PATENTS

| | | | |
|---|---|---|---|
| 3,029,783 | 4/1962 | Sawyer, Jr. et al. | 119/1 |
| 3,256,857 | 6/1966 | Karras | 119/1 |
| 3,789,797 | 2/1974 | Brewer | 119/1 |

OTHER PUBLICATIONS

Fuller R. Glen, Harston, Starr, Northeastern Wood Utilization Council Bull. No. 32:27–32 (June, 1950)–[Abstract from Institute of Paper Chemistry Bibliographic Series No. 191–Structure, Extractives and Utilization of Bark, Roth, Saeger, Lynch, Weiner; Appleton, Wisc., 1960.]

Primary Examiner—Louis G. Mancene
Assistant Examiner—Peter K. Skiff
Attorney, Agent, or Firm—Daniel J. Hanlon, Jr.; William D. Herrick; Raymond J. Miller

[57] ABSTRACT

A litter for poultry which is absorbent but capable of giving up absorbed liquids to the atmosphere under conditions of usual use in poultry houses so that the litter tends to be maintained dry to the touch and uncompacted. The litter is itself a body of moisture containing crumbs formed of low density bark and cellulosic fibrous material adhered to and carried by the bark. The poultry litter following use has a utility as cattle feed.

8 Claims, 1 Drawing Figure

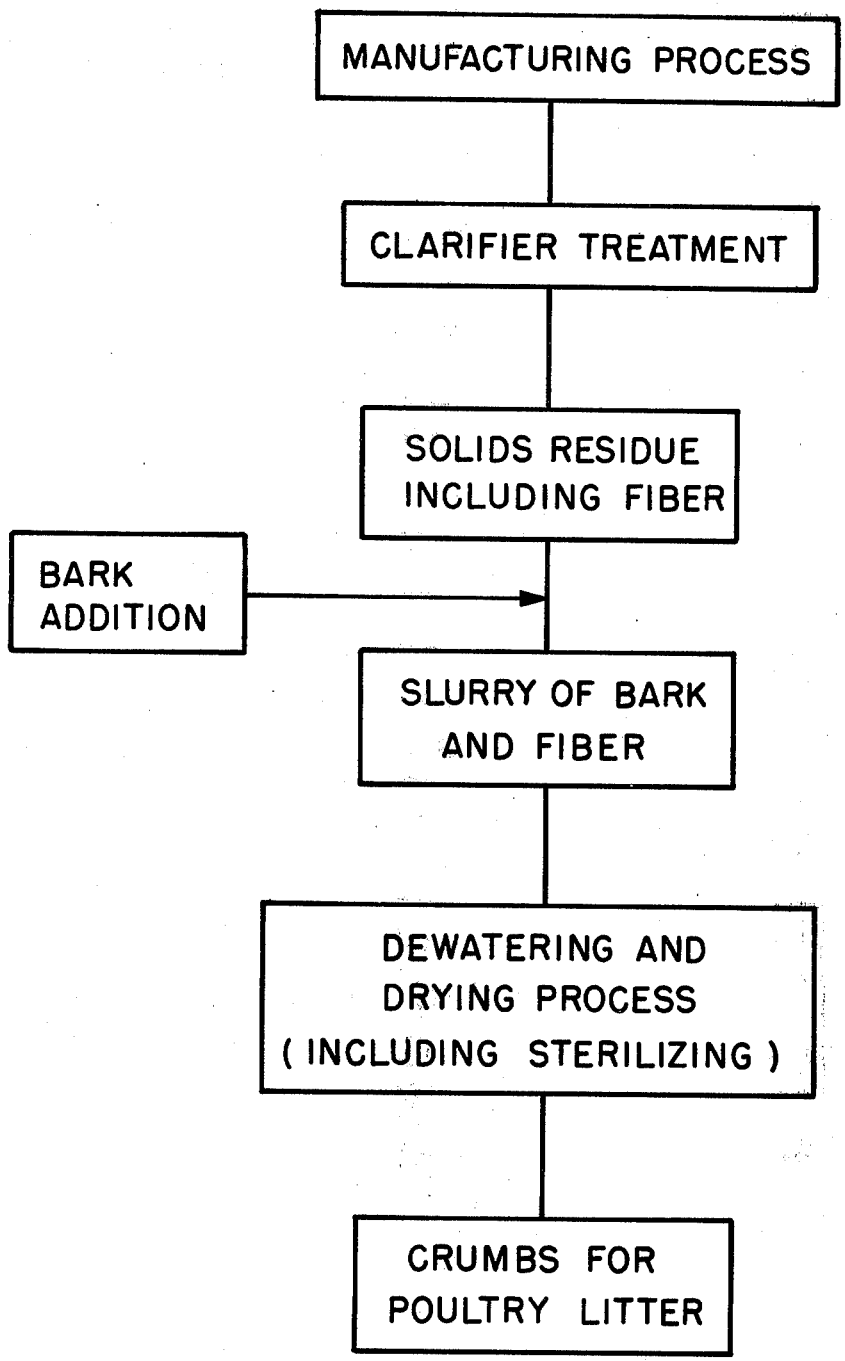

POULTRY LITTER AND PREPARATION THEREOF

BACKGROUND OF THE INVENTION

It is common practice in the poultry industry for all broilers, broiler breeding flocks and the like to be kept in houses rather than, for example, in wire cages. A management practice in such operations is the use of an adequate amount of satisfactory litter on the floors of the poultry houses.

Many materials have been tried for this purpose including wood shavings, which is currently widely used in many localities. Other materials suggested for use include aged sawdust, rice hulls, peanut hulls and finely divided limestone particles which are attached to the constituent fibers of layers of fibrous material superimposed upon one another. Another form of the litter involves the use of a combination of a grass and vermiculite. However, the demands of the industry require that the litter be relatively inexpensive, and it does appear that wood shavings have not been supplanted in use to any significant extent by other forms of litter.

By the present invention the important limitations or prior art materials have been overcome. The product provided by this invention is relatively inexpensive and derived primarily from waste materials, and exhibits certain very desirable characteristics noted hereinafter.

SUMMARY OF THE INVENTION

It is an object of the present invention to provide a composite of a fibrous material which is the effluent of a paper mill with bark particles such that the composite is absorbent and is itself capable of retaining liquid or moisture in a limited way without compaction of the particles.

An important object of the invention is to provide a litter of the kind stated above which is produced essentially from waste materials, is relatively economical to produce and attained in the form of dry crumbs which may be readily shipped, applied to poultry house floors and reused over a considerable period of time.

A particular object of the invention is to provide a litter which has a substantially neutral reaction in an aqueous system and is non-toxic to poultry.

A further object of the invention is to provide a litter which, after use and without significant treatment, may be employed as cattle feed.

The invention will be more particularly described in conjunction with the accompanying drawing incorporating a flow sheet which illustrates the basic steps of the process involved in the production of the poultry litter of the invention.

DESCRIPTION OF THE INVENTION

In essence, the mill process water effluent of the kraft process of producing paper, that is, the manufacturing process identified in the flow sheet, normally contains a large percentage of solid material and this solid material is in the form of cellulose fibers or fines which are fragments of the fibers. The product of a conventional water treatment system such as a simple mechanical clarifier may be about 94% cellulose with the remainder being mineral waste. A typical mineral waste content of the fiber residue may contain approximately 50% of silica, 45% of calcium carbonate and some iron oxide with miscellaneous metals. Such a solids residue of the settling clarifier has been found to be non-toxic to animals including poultry. The silica content probably is introduced with the wood as it is furnished to the mill and the carbonate content results from the pulping process.

The fibrous material constituting the cellulose is very largely in the form of cellulose fiber fines, that is, material which would pass through a 200 mesh screen. Some fibers, however, are of sufficient size as to be retained on a 25 mesh screen. These unbroken fibers are of wood pulp and while of long length relative to the fines, are themselves very small. The fines constitute in the specific embodiment described approximately 65% by weight on a dry basis of the solids residue of the clarifier treatment, that is, on a weight basis the proportion of fiber which passes a 200 mesh screen is approximately 2:1. The presence of such fines makes it very difficult to dewater the cellulosic material, and economical reemployment of such cellulosic matter is generally not feasible. In fact, the material is commonly used as a fill for land. This is at considerable expense as normally the fibers must be hauled to the area of disposition and suitably treated for disposition.

In the practice of this invention the dewatering of the solids residue of the clarifier treatment is effected through several means. First, to a slurry of the residue there is supplied a quantity of bark. The bark I have found most suitably should be in the form of a relatively dry material and of a size such that it would all pass through a screen of about ½ inch mesh. The particle size should be large enough so that fibrous particles, including fines and whole fibers, may attach to the particles to provide a composite which is readily handled in the poultry houses.

The bark is slurried, as indicated in the flow sheet, with the solids residue and the slurry agitated during the addition. The consistency of the slurry of fibrous material, that is, the solids residue from the clarifier treatment, is suitably about 2½% solids when the bark is added. The bark itself normally contains about 50% by weight of moisture. The bark is added, I have found, most suitably such that on a bone dry weight the composite of bark and paper fibers will be about 50% each, that is, a ratio of 1:1. While I have not explored the exact limits which are applicable, it does appear that a ratio in the range of between about 60% bark to 40% fiber to 60% fiber to 40% bark is appropriate. In any event, the important feature of the composite is that the fibers are retained by the bark particles upon drying of the material.

The presence of the bark is a material asset in the dewatering and drying operations. In specific application the slurry of bark and fiber has been pumped to a vacuum belt filter to effect a dewatering to approximately 30% bone dry solids. A subsequent treatment in a filter press is effective to increase the bone dry solids to approximately 50%.

The pressed material is relatively dry and is conveyed to a fluffing device, for example, by a screw conveyor and the fluffer, which may be a simple hammermill, breaks the material into crumbs. These crumbs pass through a tunnel dryer at approximately 400°F. to further reduce the moisture so that the litter is in about 75% bone dry condition and, when cooled, generally in an equilibrium condition with the environment into which it has moved from the tunnel dryer. It is to be noted that excessive drying is not desirable as the crumbs tend to lose too much moisture and dust may result. The 400°F. drying temperature, while not critical, has an auxiliary effect of sterilizing any existing bacteria in the fiber-bark composite which might cause molding.

The drying may be carried out such that the litter is in the range of 65 to 85% bone dry condition. However, I find in extensive conditions that the material, when employed in the southern United States, tends to come into equilibrium with the atmosphere of poultry houses at about 75% bone dry solids, a characteristic which I believe unique.

The bark which I have found to be most useful is pine bark although others may have utility. Some barks, such as southern hardwood bark, should be avoided as they give rise to fungus condition which may affect the respiratory systems of poultry and may induce a high mortality rate. The fungus in this instance is known as Aspergillosis.

It is important to note that in the use of the litter it does become wetted but in the usual atmosphere of a poultry house in the southern part of the United States the composite also tends to equilibrium conditions with the relative humidity of its environment, that is, to give back liquid to the atmosphere and to maintain itself at a 75% solids.

It is further to be noted that the litter after use has a content of uric acid and some urea and has utility as a cattle feed and this finding is a part of the present invention. As is already known, a limited amount of the nitrogen normally supplied to cattle via protein materials may be substituted in the form of urea in cattle feed.

I have found that litter formed of 50% by weight bone dry basis of pine bark and the cellulosic residue serves well in poultry houses and may be employed over a long period of time.

The composite product has proven thoroughly reliable under extensive test conditions. The poultry house stays quite dry as air movement permits evaporation and moisture removal quite readily. The mortality rate is low for the poultry and pathological conditions such as breast blisters appear to occur less frequently than when wood shavings are employed as the litter. The gray coloration of the crumbs occasioned by the filters adhering over the bark surfaces has a low light reflectivity which is apparently favored by the chickens so that there is less disturbance of the poultry in the normal operation of the poultry house.

As many apparently widely different embodiments of this invention may be made without departing from the spirit and scope thereof, it is to be understood that I do not limit myself to the specific embodiments thereof except as defined in the appended claims.

I claim:

1. A process for the conversion of waste product to a poultry litter which comprises the steps of mixing the fiber containing effluent of a paper mill with pine bark particles, and slurrying the bark particles and fibers together while agitating the slurry to cause the fibers to come into intimate contact with the bark particles, dewatering the composite of fibers and bark under conditions which cause the fibers to adhere to the bark particles and dewatering to the extent that the composite is in the form of a mass of crumbs and has a bone dry solids content of about 65 to about 85 per cent by weight.

2. A process as claimed in claim 1 in which the slurry of fibers and bark particles has a substantially neutral pH.

3. A process as claimed in claim 1 in which the fibers and bark particles are present in the slurry to substantially the same extent by weight.

4. A process as claimed in claim 1 in which the drying of the composite includes heating the bark with fibers thereon to a temperature at least about 400°F. for a sufficient length of time to sterilize the crumbs against bacteria which cause molding.

5. A process as claimed in claim 1 in which the composite in the form of the mass of crumbs is carried out to a bone dry solids content of about 75 per cent by weight.

6. A litter for poultry houses comprising a body of absorbent crumbs having pine bark particles and cellulosic wood pulp fibrous particles adhered to the bark particles, the crumbs having a solids content on a bone dry basis in the range of about 65 percent to about 85 percent and the ratio by weight on a bone dry basis of the cellulosic fibrous particles to the pine bark particles being between about 60:40 to about 40:60, said crumbs having a limited capacity to retain liquid such that the litter does not tend to compact in use.

7. A litter for poultry houses as claimed in claim 6 and in which the ratio by weight of cellulosic fibrous particles to the pine bark particles on a bone dry basis is about 1:1.

8. A litter for poultry houses as claimed in claim 6 and in which the cellulosic fibrous particles include cellulosic fiber fines.

* * * * *